United States Patent [19]

Tran et al.

[11] Patent Number: 5,677,918
[45] Date of Patent: Oct. 14, 1997

[54] METHOD AND DEVICE FOR EFFICIENT ERROR CORRECTION IN A PACKET-SWITCHED COMMUNICATION SYSTEM

[75] Inventors: Phieu Moc Tran, Lincolnwood; Jeffrey Charles Smolinske, Hoffman Estates; Robert Clarence Scheibel, Jr.; Christopher Lamonte Clanton, both of Chicago, all of Ill.

[73] Assignee: Motorola, Inc., Schaumburg, Ill.

[21] Appl. No.: 508,522

[22] Filed: Jul. 28, 1995

[51] Int. Cl.$^6$ .................................. H04J 3/26; H04L 1/16
[52] U.S. Cl. ................................................ 371/32; 370/321
[58] Field of Search .................................. 371/32; 370/321

[56] References Cited

U.S. PATENT DOCUMENTS

| | | | |
|---|---|---|---|
| 4,507,782 | 3/1985 | Kunimasa et al. | 371/32 |
| 5,050,166 | 9/1991 | Cantoni et al. | 370/473 |
| 5,471,503 | 11/1995 | Altmaier et al. | 375/202 |
| 5,479,595 | 12/1995 | Israelsson | 359/145 |
| 5,487,068 | 1/1996 | Smolinske et al. | 370/450 |
| 5,537,414 | 7/1996 | Takiyasu et al. | 370/347 |
| 5,603,081 | 2/1997 | Raith et al. | 455/33.1 |
| 5,604,744 | 2/1997 | Andersson et al. | 370/347 |

*Primary Examiner*—Stephen M. Baker
*Attorney, Agent, or Firm*—Darleen J. Stockley

[57] ABSTRACT

The method and device of the present invention provide for efficient error correction in a packet radio system by 1) eliminating wasted bandwidth due to the unnecessary retransmissions that occur as a result of lost positive acknowledgments, 2) occupying less downlink bandwidth than a scheme requiring positive acknowledgments, and 3) minimizing packet delay by providing two levels of error correction at the datalink layer.

15 Claims, 8 Drawing Sheets

5,677,918

METHOD AND DEVICE FOR EFFICIENT ERROR CORRECTION IN A PACKET-SWITCHED COMMUNICATION SYSTEM

FIELD OF THE INVENTION

The present invention relates generally to access control in a communication system, and more particularly, to error correction in a packet communication system.

BACKGROUND OF THE INVENTION

In a packet-switched communication system, data is transmitted over a channel in units called packets. When multiple users share a common channel using time division multiple access (TDMA), the packets are often divided into units called segments, each of which is then transmitted over the channel in a single TDMA burst. In a harsh radio environment, these packets may not be received correctly. Even if each of the segments of a packet is protected by a separate error detection code and is retransmitted immediately upon detection of an error in the segment, the packet may not be received entirely correctly. One such situation occurs when an error is undetected by the segment-level error detection code. Another similar situation may arise due to reverse radio frequency (RF) capture. Reverse RF capture can occur when two subscriber units (SUs), say SU-A and SU-B, begin transmitting a packet simultaneously. For the first few bursts of the packet(s), the base site receives only the signal transmitted by SU-A due to RF capture. For the remainder of the packet, only the signal transmitted by SU-B is received by the base site, again due to RF capture. Both of these situations result in a reassembled packet at the base site containing errors which the segment-level error detection codes were unable to detect.

Typically, these errors are corrected by software at a higher open systems interconnection, OSI, layer. However, processing at a higher OSI layer significantly increases the overall transmission delay of the packet. Thus, there is a need for an efficient error correction scheme at the datalink layer.

DETAILED DESCRIPTION OF A PREFERRED EMBODIMENT

The method and device of the present invention provide for efficient error correction in a packet radio system by 1) eliminating wasted bandwidth due to the unnecessary retransmissions that occur as a result of lost positive acknowledgments, 2) occupying less downlink bandwidth than a scheme requiring positive acknowledgments, and 3) minimizing packet delay by providing two levels of error correction at the datalink layer.

In a preferred embodiment of the present invention, data is transmitted on an uplink channel from a subscriber unit (SU) to a base site in groups called packets. A packet of data is divided into units called segments, each of which is transmitted in a single time division multiple access (TDMA) burst. The receiver then reassembles a packet from its constituent segments. Each of the segments is protected by a segment-level selective repeat automatic repeat request (ARQ) error correction mechanism. Each packet is in turn protected by a packet-level selective repeat ARQ scheme at the datalink layer. The segment-level ARQ scheme uses both positive and negative acknowledgments while the packet-level ARQ scheme uses only negative acknowledgments.

Figure 1:
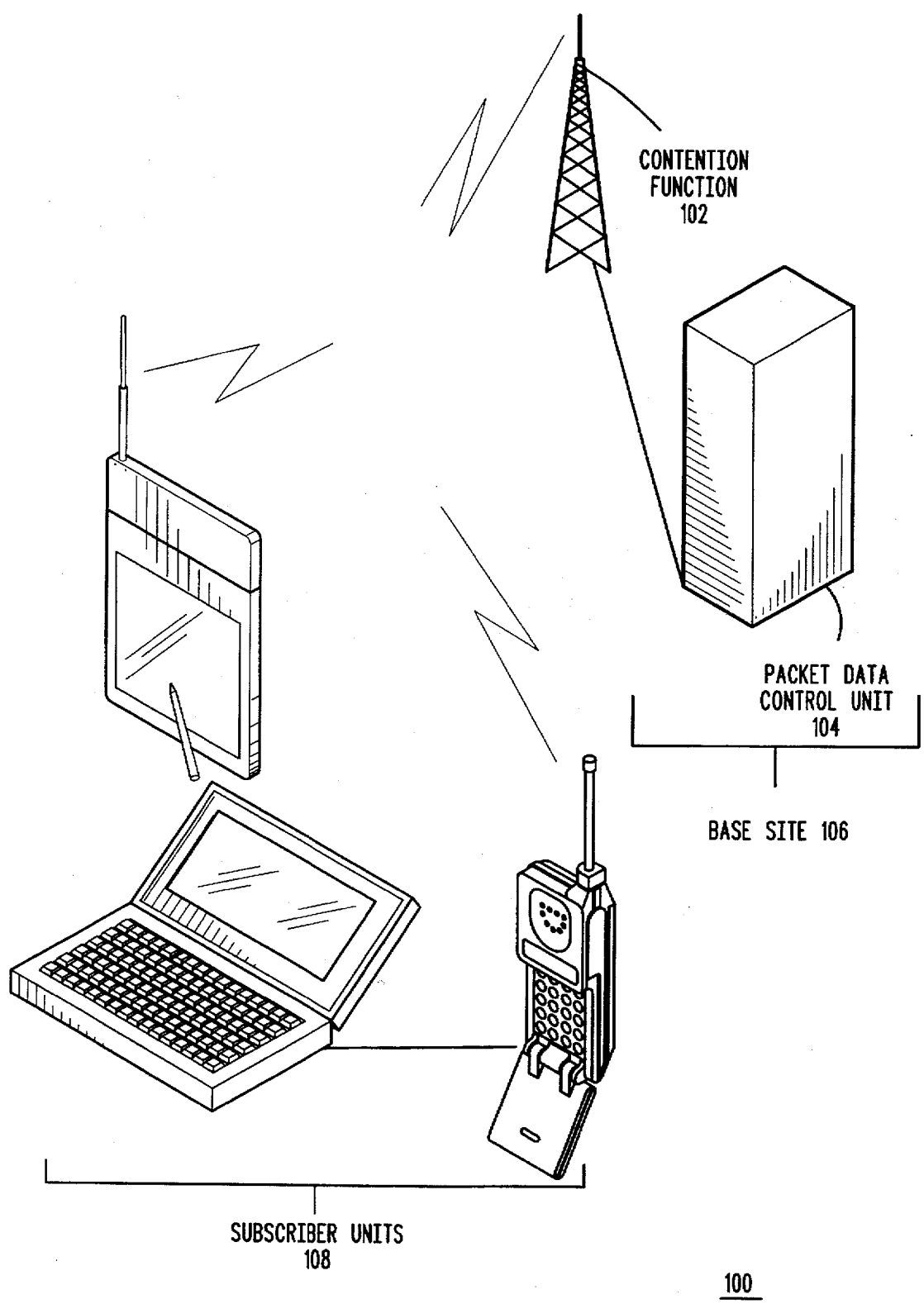
FIG. 1 is a diagrammatic representation of a preferred hardware embodiment in accordance with the present invention.

FIG. 1, numeral 100, is a diagrammatic representation of a preferred hardware embodiment in accordance with the present invention. The contention function (102) and the packet data control unit (104) will be jointly referred to as the base site (106) in this document. The base site communicates with one or more subscriber units (108) over a common channel by sending bursts of data back and forth.

Figure 2:
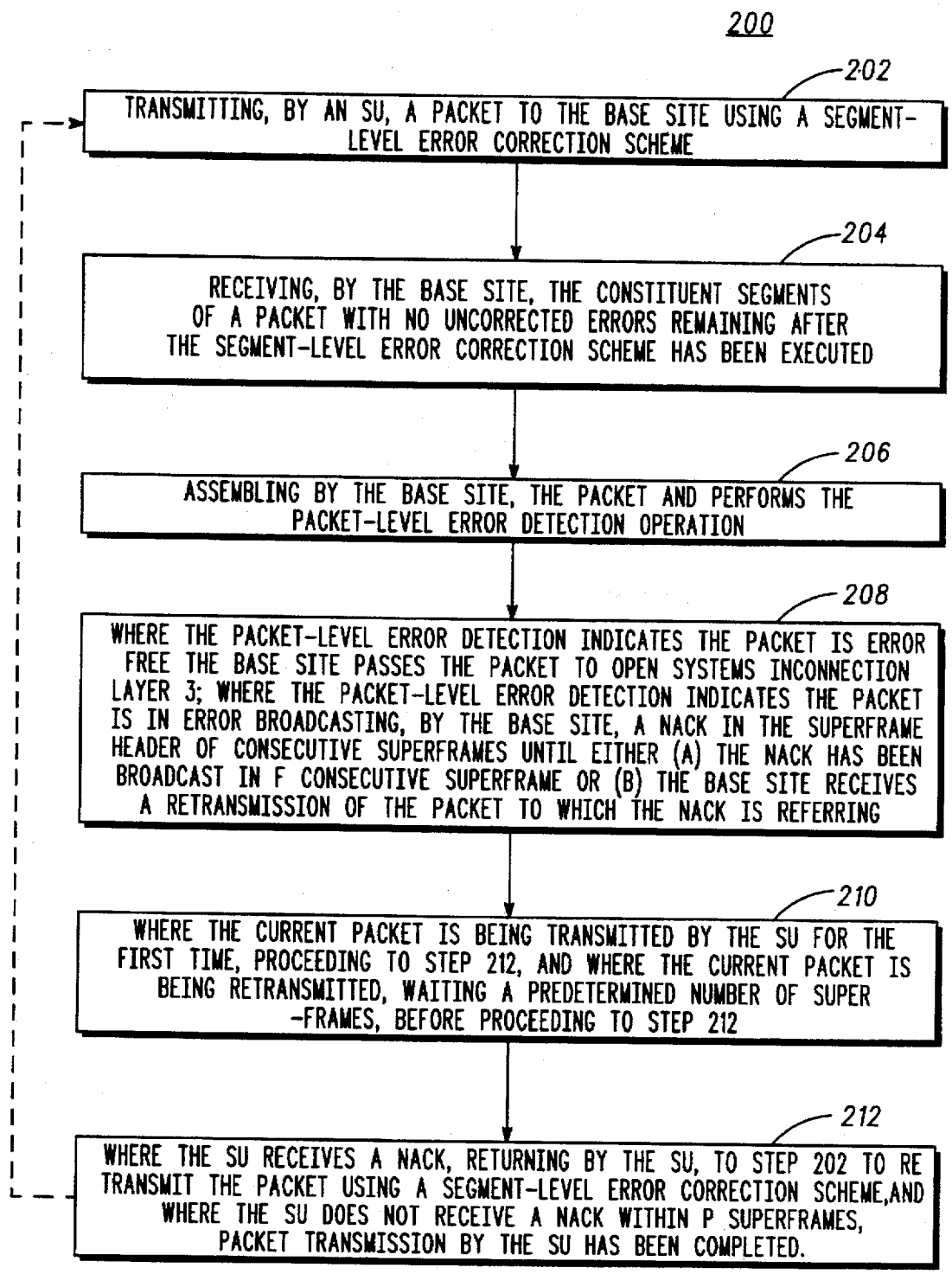
FIG. 2 is a flow chart showing one embodiment of steps in accordance with the method of the present invention.
Figure 6:
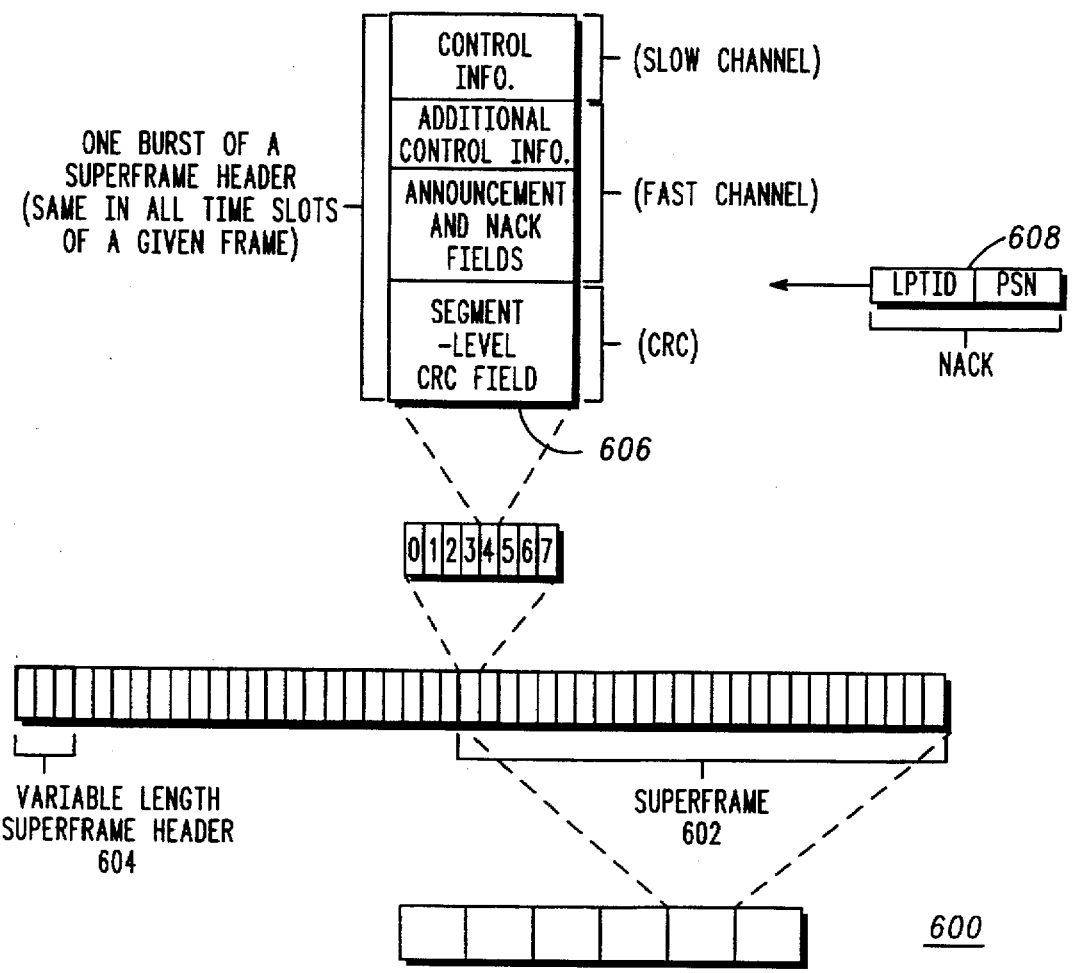
FIG. 6 is a diagrammatic representation of a superframe and a superframe header in accordance with the present invention.

FIG. 2, numeral 200, is a flow chart showing one embodiment of steps in accordance with the method of the present invention. The SU transmits a packet to the base site using a segment-level error correction scheme (202). The base site receives the constituent segments of a packet with no uncorrected errors remaining after the segment-level error correction scheme has been executed (204). The base site assembles the packet and performs the packet-level error detection operation (206). Where the packet-level error detection indicates the packet is error-free, the base site passes the packet to open systems interconnection layer 3, and where the packet-level error detection indicates the packet is in error, the base site broadcasts a negative acknowledgment (NACK) in the superframe header of consecutive superframes until one of the following occurs: (a) the NACK has been broadcast in F consecutive superframes, or (b) the base site receives a retransmission of the packet to which the NACK is referring (208). A superframe is a fixed length structure of L frames as illustrated in FIG. 6. A superframe header is a variable length data structure broadcast to all SUs at the beginning of each superframe (also illustrated in FIG. 6). Where the current packet is being transmitted by the SU for the first time, proceeding to step 212, and where the current packet is being retransmitted, waiting a predetermined number of superframes, then proceeding to step 212 (210). Where the SU receives a NACK, the SU returns to step 202 to retransmit the packet using a segment-level error correction scheme, and where the SU fails to receive a NACK within P superframes, packet transmission by the SU has been completed (212).

The details of this two-level error correction mechanism as well as the data structures through which it is implemented are described in the following.

Figure 3:
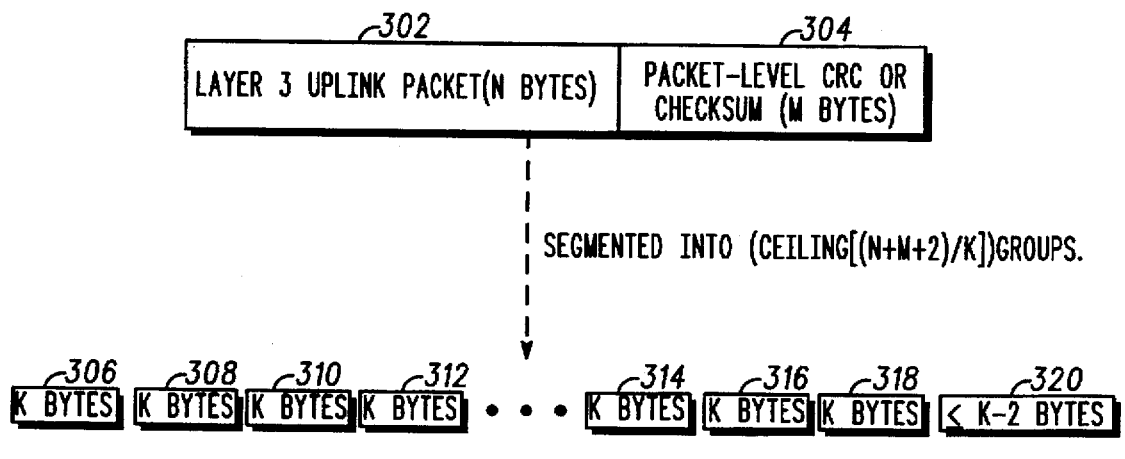
FIG. 3 is a diagrammatic representation of the organization of a layer 3 packet for transmission on the physical channel in accordance with the present invention.

A layer 3 packet is organized as shown in FIG. 3, numeral 300, for transmission on the physical channel. An N-byte packet (302) is appended with an M-byte error detection code (304) and then divided into x (=ceiling((N+M+2)/k)) k-byte groups (306, 308, . . . ), where k is the number of bytes of payload data the particular system transmits in one TDMA burst.

Figure 4:
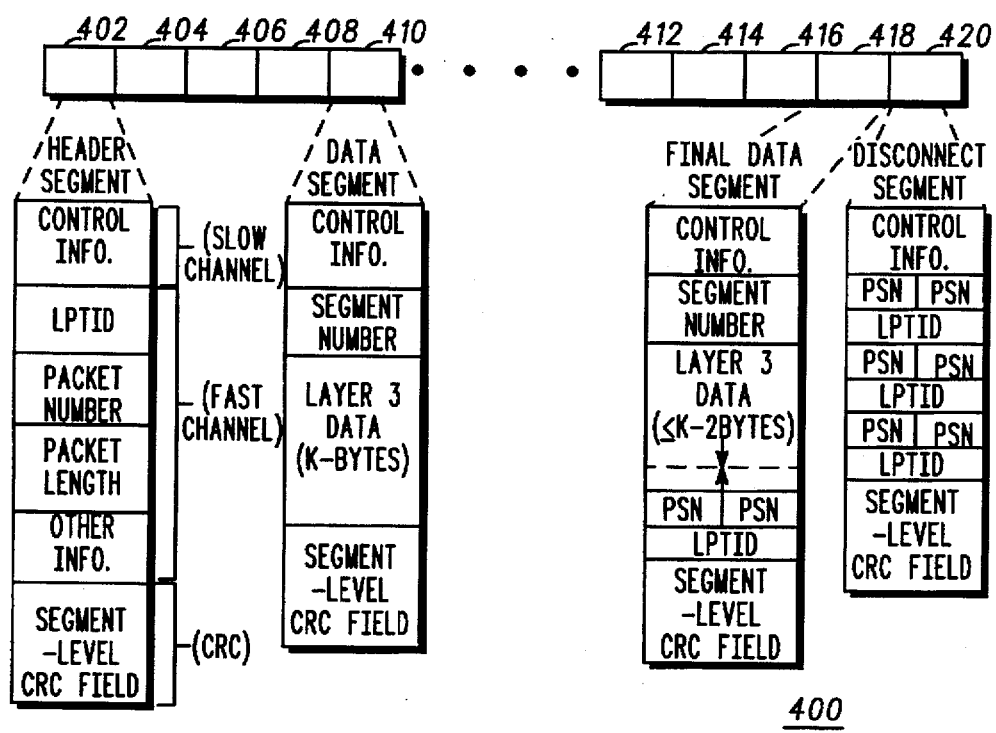
FIG. 4 is a diagrammatic representation of a packet that is formatted for transmission on the particular air-interface in accordance with the present invention.

The packet is then formatted for transmission on the particular air-interface as shown in FIG. 4, numeral 400. In the Personal Access Communication System (PACS) this involves the creation of the header segment (402), the first x−1 data segments (404, 406, . . . ), the final data segment (418), and the disconnect segment (420). The header segment contains some control information, an address (LPTID), some packet reassembly information (packet length, packet number), some other miscellaneous information, and a 16-bit cyclic redundancy check (CRC) code protecting all the data comprising this segment. The first x−1 data segments each consist of control information, a segment number, the corresponding k-byte group of data (the payload), and a 16-bit CRC code. As in FIG. 3, the payload corresponding to the final data segment may contain less than k bytes of data. The final data segment contains control information, a segment number, payload data, and a 16-bit CRC code, and at least one local packet terminal identifier (LPTID) and two packet sequence numbers (PSNs). The PSN consists of the three least significant bits of the packet number. Any additional space created by the smaller payload is filled with additional copies of the LPTID and the PSN. The disconnect segment is used primarily for purposes of channel arbitration, and is not considered part of the packet. It contains some control information, a 16-bit CRC code, and a number of copies of the LPTID and the PSN.

Figure 5:
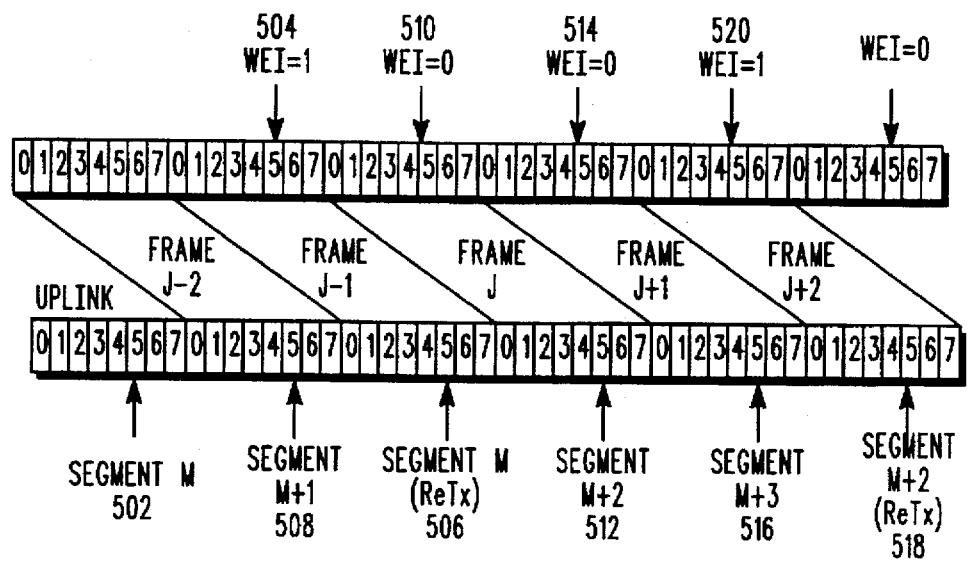
FIG. 5 is a diagrammatic representation of an exemplary two frame timing delay between the initial transmission of a segment and its retransmission (if necessary) in the PACS packet channel (PPC) protocol in accordance with the present invention.

As described earlier, the present invention provides both segment-level and packet-level protection against channel errors. In the preferred embodiment, the segment-level error correction is a selective repeat automatic repeat request (ARQ) scheme. As the example in FIG. 5 illustrates, a two-frame delay exists between the initial transmission of a segment and its retransmission (if necessary) in the PACS packet channel (PPC) protocol. The base site receives segments in a particular frame on the uplink, computes the CRC, and transmits the results on the downlink two numbered frames later. In this example, segment m is transmitted (erroneously) in frame j−3 (502). Upon reading that the word error indication (WEI) equals one in frame j−1 (504) (indicating that an error was detected in the uplink of frame j−3), the SU retransmits segment m (506). While waiting to receive the WEI, the SU transmits segment m+1 in frame j−2 (508). The corresponding WEI in frame j is zero (510) (indicating that no errors were detected on the uplink of frame j−2), and the SU transmits segment m+2 (512). The WEI in frame j+1 (514) indicates that no errors were detected in the retransmission of segment m, and segment m+3 is transmitted (516). Segment m+2 is retransmitted in frame j+2 (518) since an error was detected in frame j (520).

As soon as all segments comprising a given packet have been received without any detected errors, the PDCU performs the packet-level error detection operation. If this operation indicates that the packet is error free, the packet is passed to layer 3. If an error is detected at the packet level, the PDCU broadcasts a negative acknowledgment (NACK) to the SU via the superframe header as illustrated in FIG. 6.

In the PPC protocol, a NACK is a 12-bit field transmitted in a superframe header. The PPC downlink channel is divided into constant-length structures of L frames each called superframes. As shown in FIG. 6, numeral 600, the superframe (602) is delimited by the first segment of the superframe header (604). The superframe header is a structure of length j frames, where j may vary from one superframe to the next. The remaining L−j frames are used for other downlink segments. The same segment is transmitted in all time slots of a given frame of the superframe header (606). The fast channel of the superframe header contains both announcements (to announce the arrival of downlink packets) and NACKs. The NACK (608) contains the LPTID and sequence number of the packet in which an error was detected. Upon detecting an error at the packet level, the base site must determine which LPTID and sequence number to include in the NACK. If all the LPTIDs and PSNs contained in the header segment, the final data segment, and the disconnect segment match, the base site creates a NACK segment containing that LPTID and PSN and broadcasts it in superframe headers as described below. If either the LPTIDs or the PSNs do not match, the base site uses the LPTID and/or PSN which occurred within the packet the most often to create the NACK. The reason for this is twofold. First, the error which was detected at the packet level may have corrupted one or more of the LPTID or PSN fields. It is unlikely, however, that this would result in changing a majority of the LPTID or PSN fields to the same incorrect value. Second, the error may have been a result of reverse radio frequency (RF) capture. Reverse RF capture can occur when two subscriber units (SUs), say SU-A and SU-B, begin transmitting a packet simultaneously. For the first few bursts of the packet(s), the base site receives only the signal transmitted by SU-A due to RF capture. For the remainder of the packet, only the signal transmitted by SU-B is received by the base site, again due to RF capture. In this case, it is likely that the SU which transmitted the header segment (SU-A) has already determined that the packet was transmitted erroneously, and only the SU which transmitted the last portion of the segments (SU-B) requires negative acknowledgment. Since the LPTID of SU-A will occur only once within the packet, and the LPTID of SU-B will occur at least once, the NACK will, in fact, contain the LPTID for SU-B. Once the NACK has been created, it is then broadcast in F consecutive superframe headers, or until the retransmission of the erroneous packet is received.

When the SU has completed transmission of a packet, the SU searches for a NACK in P consecutive superframe headers, retransmitting the packet if a NACK with the SU's LPTID and the packet's PSN is received. If, however, the packet was being retransmitted in response to an earlier NACK, the base site may not have had time to process the current packet and stop sending NACKs referring to errors in the previous transmission. For this reason, the SU must wait a predetermined amount of time prior to searching for a NACK in P consecutive superframe headers.

Figure 7:
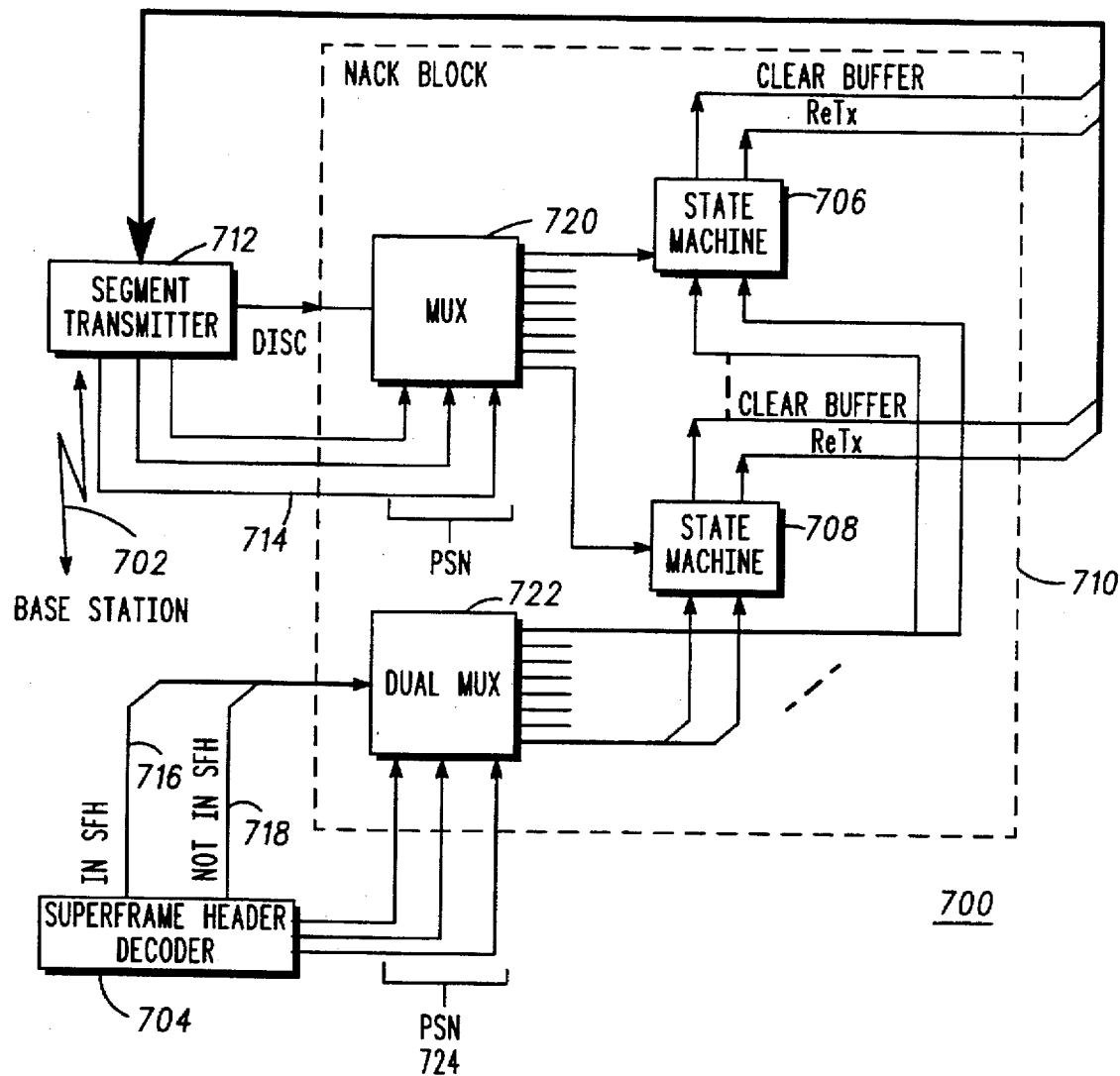
FIG. 7 is a block diagram of a preferred embodiment of a hardware implementation of the present invention.
Figure 8:
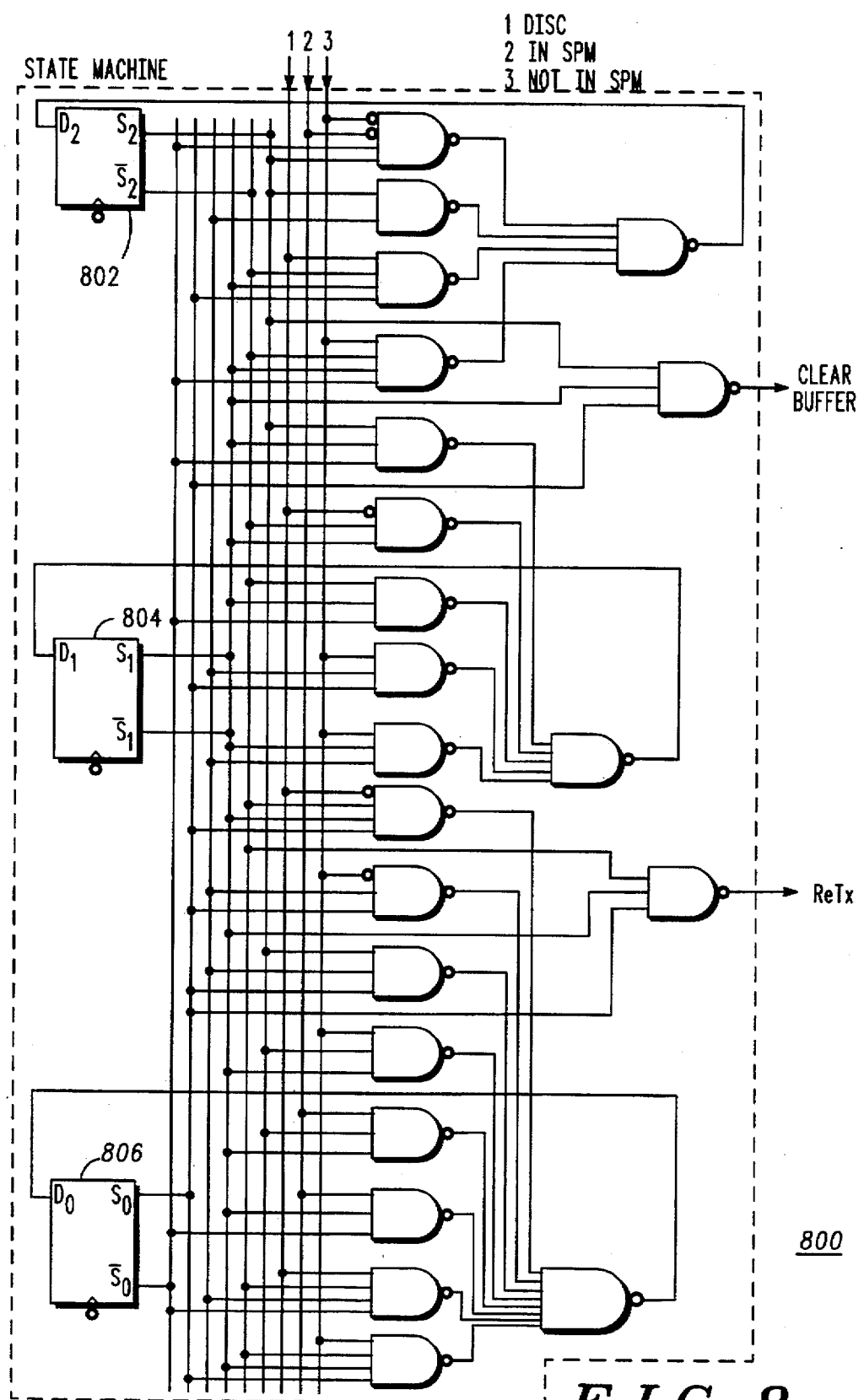
FIG. 8 is a diagrammatic representation of one embodiment of a state machine of FIG. 7, shown with greater particularity.

FIG. 7, numeral 700, and FIG. 8, numeral 800, illustrate a hardware implementation of the preferred embodiment of the present invention. The hardware design consists of a segment transmitter (702), a superframe header decoder (704), and a state machine (706, 708, . . . ) for each PSN. The negative acknowledgment unit (710) comprises all of the state machines, and some supporting circuitry. The segment transmitter transmits, to a base site, the constituent segments of a given packet and corrects transmission errors using a segment-level selective repeat ARQ scheme. When all of the segments have been transmitted, the segment transmitter sends a DISC signal (712) as well as the PSN (714) to the negative acknowledgment unit. The superframe header decoder sends eight (8) signal groups, one corresponding to each PSN, to the negative acknowledgment unit at the conclusion of each superframe header. For each PSN, if the current superframe header contains a NACK with an LPTID field matching the SU's and a PSN field matching the particular PSN, the superframe header decoder sends an In SFH signal (716), where SFH means superframe header, and the PSN (722) to the negative acknowledgment unit. If the current superframe header does not contain a NACK with an LPTID field matching that of the SU and a PSN field matching the particular PSN, the superframe header decoder sends a Not In SFH signal (718) and the PSN (722) to the negative acknowledgment unit. Each state machine has three inputs (DISC, In SFH, and Not In SFH), and two outputs (Clear Buffer, and ReTx). The state machine sends the ReTx signal when the packet should be retransmitted, and sends the Clear Buffer signal when packet transmission for the packet with the corresponding PSN has completed.

Thus, FIG. 7, numeral 700, shows a device in a subscriber unit for implementing a novel method for error correction in a packet-switched communication system in accordance with the present invention. The device (700) includes: a segment transmitter (702), a negative acknowledgment unit (710), and a superframe header decoder (704). The segment transmitter (702) is utilized for transmitting a plurality of segments comprising a packet to a base site that, upon determining that the packet is in error, broadcasts a negative acknowledgment, NACK, in one or more superframe headers. The negative acknowledgment unit (710) is coupled to a segment transmitter (702) and to a superframe header decoder (704), and is used for generating a plurality of clear buffer signals and retransmission signals in accordance with a predetermined scheme. The superframe header decoder (704) is coupled to the negative acknowledgment unit (710) and is used for determining presence/absence of a negative acknowledgment in a superframe header and generating one of an In SFH signal (716) and a Not In SFH signal (718) indicating said presence/absence to the negative acknowledgment unit (710). The negative acknowledgment unit (710) typically includes: A) a multiplexer (720) that is coupled to receive the DISC signal (712) and the PSN (714) from the segment transmitter (702) and is used for sending this information to the appropriate state machine in accordance with a predetermined scheme; B) a dual-input multiplexer (724) that is coupled to receive the PSN (722) and one of 1) the In SFH signal (716) and 2) the Not In SFH signal (718) and is used to transmit this information to the appropriate state machine; and C) the plurality of state machines (706, 708, ... ), one for each PSN, that are coupled to the multiplexer (720) and that utilize the In SFH signal and the Not In SFH signal for determining whether to retransmit a packet.

FIG. 8 shows one embodiment of a state machine of FIG. 7 with greater particularity. In this example, the state machine includes three flip-flops (802, 804, 806) coupled to a plurality of logic gates in accordance with a predetermined scheme to provide a clear buffer signal and a retransmission signal.

Figure 9A:
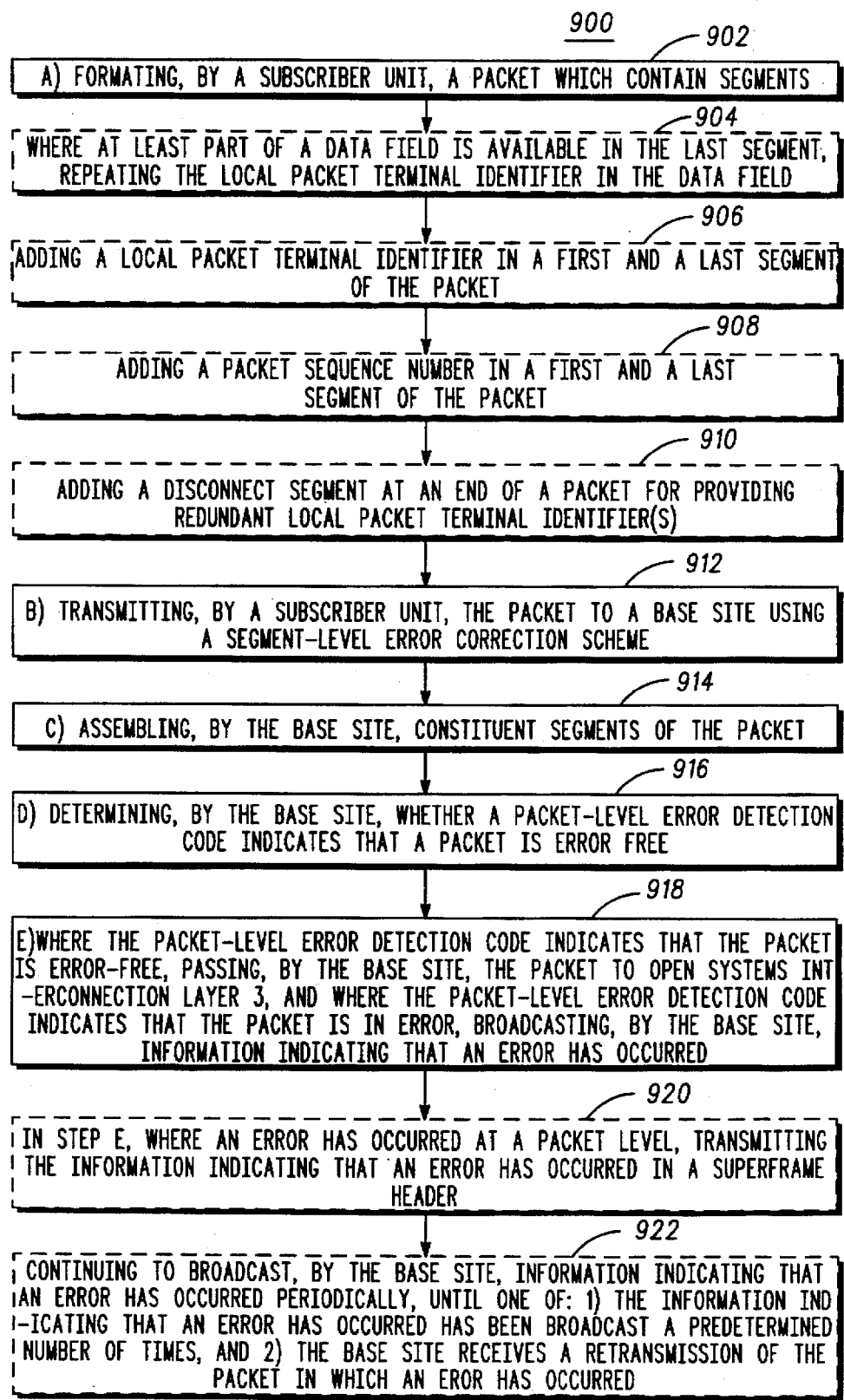
FIG. 9 is a flow chart of steps of a preferred embodiment of the method in accordance with the present invention.
Figure 9B:
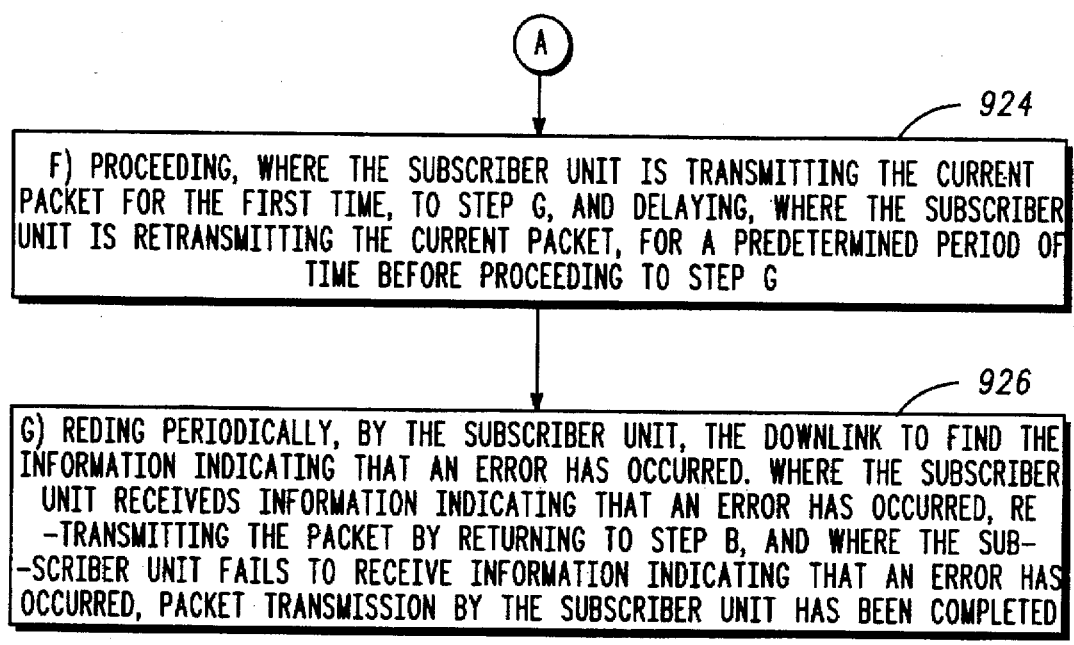

FIG. 9, numeral 900, is a flow chart of steps of a preferred embodiment of the method in accordance with the present invention. The method includes: A) formatting (902), by a subscriber unit, a packet which contains segments; B) transmitting (912), by a subscriber unit, a packet to a base site using a segment-level error correction scheme; C) assembling (914), by the base site, constituent segments of a packet; D) determining (916), by the base site, whether a packet-level error detection code indicates that a packet is error-free; E) where the packet-level error detection code indicates that the packet is error-free, passing (918), by the base site, the packet to open systems interconnection layer 3, and where the packet-level error detection code indicates that the packet is in error, broadcasting, by the base site, information indicating that an error has occurred; F) proceeding (924), where the subscriber unit is transmitting the current packet for the first time, to step G, and delaying, where the subscriber unit is retransmitting the current packet, for a predetermined period of time before proceeding to step G; and G) reading periodically (926), by the subscriber unit, the downlink to find the information indicating that an error has occurred. where the subscriber unit receives information indicating that an error has occurred, retransmitting the packet by returning to step B, and where the subscriber unit fails to receive information indicating that an error has occurred, packet transmission by the subscriber unit has been completed.

The packet-switched communication system is typically a TDMA system. The segment-level error correction scheme may be selected to be a selective-repeat automatic repeat request algorithm. The packet-level error detection field is generally one of: a cyclic redundancy check (CRC), and a checksum. In an embodiment wherein a systematic cyclic code is utilized, 90 is typically a number of bits protected by the CRC and 105 typically is a total number of bits being transmitted after a 15-bit CRC field is appended to the 90-bit information block.

Where selected, in step E, where an error has occurred at a packet level, the method may be selected to include transmitting (920) the information indicating that an error has occurred in a superframe header.

Where selected, in step E, the base site may continue (922) to broadcast information indicating that an error has occurred periodically, until one of: 1) the information indicating that an error has occurred has been broadcast a predetermined number of times, and 2) the base site receives a retransmission of the packet in which an error has occurred.

Where selected, the method may include at least one of: A) where at least part of a data field is available in the last segment, repeating (904) the local packet terminal identifier in the data field B) adding (906) a local packet terminal identifier in a first and a last segment of the packet; C) adding (908) a packet sequence number in a first and a last segment of the packet; and D) adding (910) a disconnect segment at an end of a packet for providing redundant local packet terminal identifier(s).

We claim:

1. A novel method for error correction in a packet-switched communication system, comprising the steps of:

A) transmitting, by a subscriber unit, a packet to a base site using a segment-level error correction scheme;

B) assembling, by the base site, constituent segments of a packet;

C) determining whether a packet-level error detection code indicates that a packet is error-free;

D) where the packet-level error detection code indicates that the packet is error-free, passing, by the base site, the packet to open systems interconnection layer 3, and where the packet-level error detection code indicates that the packet is in error, broadcasting, by the base site, information indicating that an error has occurred; and E) where the subscriber unit receives information indicating that an error has occurred, retransmitting the packet by returning to step A, and where the subscriber unit fails to receive information indicating that an error has occurred, packet transmission by the subscriber unit has been completed.

2. The method of claim 1 wherein the packet-switched communication system is a time division multiple access system.

3. The method of claim 1 wherein the segment-level error correction scheme is a selective-repeat automatic repeat request algorithm.

4. The method of claim 1 further including a step between steps C and D comprising: proceeding, where the subscriber unit is transmitting the current packet for the first time, to step D, and delaying, where the subscriber unit is retransmitting the current packet, for a predetermined period of time before proceeding to step D.

5. The method of claim 1 further including transmitting a local packet terminal identifier in a first and a last segment of the packet.

6. The method of claim 1 further including transmitting a packet sequence number in a first and a last segment of the packet.

7. The method of claim 1 further including adding a disconnect segment at an end of a packet for providing redundant local packet terminal identifier(s).

8. The method of claim 1 further including, in step C, continuing to broadcast, by the base site, information indicating that an error has occurred periodically, until one of:

A) the information indicating that an error has occurred has been broadcast a predetermined number of times, and B) the base site receives a retransmission of the packet in which an error has occurred.

9. The method of claim 8 further including, when information indicating that an error has occurred has been unreceived for a predetermined period of time, clearing, by the subscriber unit, memory that contained the packet.

10. The method of claim 1 wherein the packet-level error detection field is one of: a cyclic redundancy check (CRC), and a checksum.

11. The method of claim 10 wherein a systematic cyclic code is utilized, wherein a number of bits protected by the CRC is 90 and wherein a total number of bits being transmitted after a 15-bit CRC field is appended to the 90-bit information block is 105.

12. The method of claim 10 further including in step E, where an error has occurred at a packet level, transmitting the information indicating that an error has occurred in a superframe header.

13. The method of claim 12 further including, where at least part of a data field is available in the last segment, repeating the local packet terminal identifier in the data field.

14. A device in a subscriber unit for implementing a novel method for error correction in a packet-switched communication system comprising:

A) a segment transmitter for transmitting a plurality of segments comprising a packet to a base site that, upon determining that the packet is in error, broadcasts a negative acknowledgment, NACK, in a superframe header of the packet;

B) a negative acknowledgment unit, coupled to receive the plurality of segments from the segment transmitter and to a superframe header decoder, for generating a plurality of clear buffer signals and retransmission signals in accordance with a predetermined scheme;

C) the superframe header decoder, coupled to the negative acknowledgment unit, for determining presence/absence of a negative acknowledgment in a superframe header of the packet and generating a presence/absence signal indicating said presence/absence to the negative acknowledgment unit.

15. The device of claim 14 wherein the negative acknowledgment unit includes:

A) a multiplexer, coupled to receive a DISC signal and a PSN from the segment transmitter, for sending information to the appropriate state machines in accordance with a predetermined scheme;

B) a dual-input multiplexer, coupled to receive the PSN and one of 1) an In SFH signal and 2) a Not In SFH signal, and used to transmit this information to the appropriate state machine;

C) the plurality of state machines, one for each time division multiple access time slot, coupled to the multiplexers, for utilizing the presence/absence signal for determining whether to retransmit a packet.

* * * * *